(12) United States Patent
Schorr

(10) Patent No.: US 11,212,157 B1
(45) Date of Patent: Dec. 28, 2021

(54) CALIBRATION METHOD AND CALIBRATION SYSTEM

(71) Applicant: Rohde & Schwarz GmbH & Co. KG, Munich (DE)

(72) Inventor: Torsten Schorr, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/913,159

(22) Filed: Jun. 26, 2020

(51) Int. Cl.
*H04L 27/36* (2006.01)
*H04B 17/00* (2015.01)
*H04L 27/26* (2006.01)
*H04B 17/11* (2015.01)

(52) U.S. Cl.
CPC ....... *H04L 27/364* (2013.01); *H04B 17/0085* (2013.01); *H04B 17/11* (2015.01); *H04L 27/2626* (2013.01); *H04L 27/2666* (2013.01)

(58) Field of Classification Search
CPC .............. H04L 27/364; H04L 27/2626; H04L 27/2666; H04B 17/11; H04B 17/0085
See application file for complete search history.

(56) References Cited

U.S. PATENT DOCUMENTS

| | | | |
|---|---|---|---|
| 2004/0063416 A1 | 4/2004 | Kuenen et al. | |
| 2004/0106380 A1* | 6/2004 | Vassiliou | H04B 17/20 455/73 |
| 2006/0160534 A1* | 7/2006 | Jung | H04B 1/0483 455/423 |
| 2009/0180527 A1 | 7/2009 | Asami | |
| 2012/0294347 A1* | 11/2012 | Husted | H04B 17/14 375/224 |
| 2014/0177761 A1* | 6/2014 | Patel | H04L 27/06 375/340 |

(Continued)

FOREIGN PATENT DOCUMENTS

EP 2839620 B1 2/2015

OTHER PUBLICATIONS

Kim, M., et al., "Parametric Method of Frequency-Dependent I/Q Imbalance Compensation for Wideband Quadrature Modulator," IEEE Transactions on Microwave Theory and Techniques 61(1):270-280, Jan. 2013.

*Primary Examiner* — Freshteh N Aghdam
(74) *Attorney, Agent, or Firm* — Christensen O'Connor Johnson Kindness PLLC

(57) ABSTRACT

A calibration method for calibrating an electronic device is described. The method comprises: generating a test signal having a predefined bandwidth, said test signal comprising an asymmetric signal component being asymmetric in frequency domain, and said test signal further comprising a symmetric signal component being symmetric in frequency domain; processing said test signal via said electronic device, thereby generating a response signal of said electronic device to said test signal; analyzing said response signal, thereby generating measurement data comprising information on impairments due to at least one of a frequency selective channel of said electronic device and an IQ mismatch of said electronic device; and adapting at least one operational parameter of said electronic device based on said measurement data in order to calibrate the electronic device. Further, a calibration system is described.

20 Claims, 3 Drawing Sheets

(56) References Cited

U.S. PATENT DOCUMENTS

| | | | |
|---|---|---|---|
| 2015/0350000 A1* | 12/2015 | Chang | H04L 27/364 |
| | | | 375/227 |
| 2017/0257176 A1* | 9/2017 | Eo | H04B 17/0085 |
| 2018/0278344 A1* | 9/2018 | Freiberger | H04L 1/244 |
| 2020/0373964 A1* | 11/2020 | Zhang | H04L 27/364 |

* cited by examiner

- S1 — generate test signal
- S2 — generate response signal
- S3 — analyze response signal
- S4 — determine set of equations
- S5 — adapt operational parameters Fig. 5
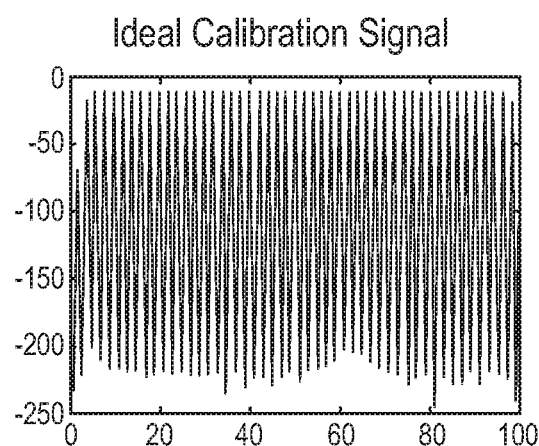
Fig. 5A
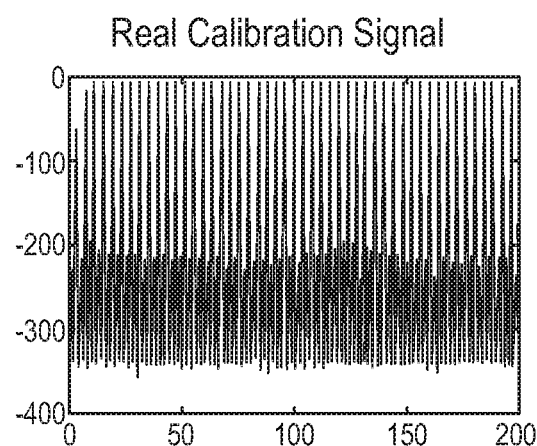
Fig. 5B
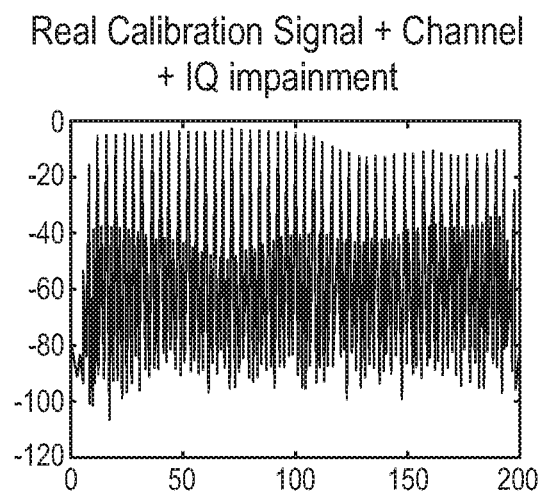
Fig. 5C
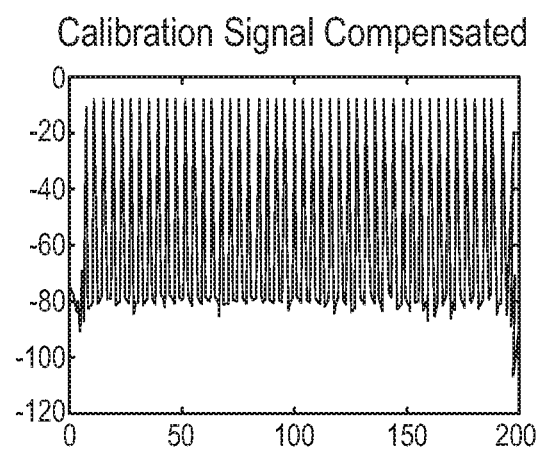
Fig. 5D

CALIBRATION METHOD AND CALIBRATION SYSTEM

FIELD OF THE DISCLOSURE

Embodiments of the present disclosure generally relate to a calibration method for calibrating an electronic device. Embodiments of the present disclosure further relate to a calibration system.

BACKGROUND

Output signals generated by electronic devices having two different channels, e.g. an in-phase channel and a quadrature channel, usually bear certain types of impairments due to imperfect hardware of the electronic device.

For example, the output signal may be impaired due to frequency selective channels of the electronic device.

Moreover, respective transfer functions of the individual channels of the electronic device may be different from each other, which results in a relative phase shift and/or attenuation of the individual signals associated with the individual channels. The relative phase shift and the relative attenuation between the channels may also be frequency selective.

Thus, such electronic devices usually have to be calibrated over their entire useful bandwidth before usage in order to compensate for the impairments described above.

In the state of the art, calibration methods using a continuous wave (CW) signal are known. Therein, an electronic device is supplied with a single CW signal having a single predefined frequency, and the response of the electronic device to the CW signal is measured. Afterwards, this measurement is repeated several times with different CW signal frequencies in order to calibrate the electronic device over its entire useful bandwidth.

However, this calibration method is rather time consuming, as several measurements have to be performed one after another.

Accordingly, there is a need for a calibration method as well as a calibration system that allows for a faster and more convenient calibration of an electronic device.

SUMMARY

Embodiments of the present disclosure provide a calibration method for calibrating an electronic device. In an embodiment, the calibration method comprises the following steps:

generating a test signal having a predefined bandwidth, the test signal comprising an asymmetric signal component being asymmetric in frequency domain, and the test signal further comprising a symmetric signal component being symmetric in frequency domain;

processing the test signal via the electronic device, thereby generating a response signal of the electronic device to the test signal;

analyzing the response signal, thereby generating measurement data comprising information on impairments due to at least one of a frequency selective channel of the electronic device and an IQ mismatch of the electronic device; and adapting at least one operational parameter of the electronic device based on the measurement data in order to calibrate the electronic device.

Therein and in the following, the term "asymmetric in frequency domain" is understood to denote a signal having a non-symmetric frequency spectrum. In some embodiments, an absolute value of the frequency spectrum is non-symmetric.

Likewise, the term "symmetric in frequency domain" is understood to denote a signal having a symmetric frequency spectrum, wherein the symmetry may be one of an axial symmetry and a point symmetry. In some embodiments, an absolute value of the frequency spectrum is axially symmetric such that the frequency spectrum itself may be one of axially symmetric and anti-symmetric.

It is noted that the test signal may be generated externally and may be provided to the electronic device, for example if the electronic device is established as a receiver.

However, the test signal may also be generated by the electronic device or circuit thereof, for example if the electronic device is established as a signal generator. Thus, a corresponding instruction signal may be generated externally and provided to the electronic device, wherein the instruction signal comprises information on the test signal to be generated by the electronic device, for example information on the predefined bandwidth.

The calibration method according to the present disclosure is based on the finding that the electronic device can be calibrated with a reduced number of steps, for example within a single calibration iteration, by using the test signal having both the asymmetric signal component and the symmetric signal component.

Generally speaking, the response signal comprises two different contributions. On one hand, the response signal comprises the "correct" response, i.e. the ideal response of the electronic device to the test signal. On the other hand, the response signal comprises the impairments due to at least one of a frequency selective channel of the electronic device and an IQ mismatch of the electronic device.

Due to the asymmetric signal component, the ideal response of the electronic device and the contributions from the impairments do not overlap in frequency space, or at least can be separated from one another unambiguously even for larger predefined bandwidths of the test signal. In other words, the ideal response of the electronic device and the impairments are mutually orthogonal.

Thus, the calibration of the electronic device can be performed over a larger bandwidth (i.e. over the predefined bandwidth) within a single calibration iteration.

Moreover, due to the symmetric signal component, a potential phase ambiguity, e.g. in the case of the test signal being an IQ signal, is resolved, as the phase of the test signal can be unambiguously determined from the symmetric signal component.

In some embodiments, the symmetric signal component may be associated with a pure in-phase signal (I-signal) or with a pure quadrature signal (Q-signal).

The symmetric signal component may have a small bandwidth compared to the asymmetric signal component. In some embodiments, the symmetric signal component may comprise only a single sine- or cosine-wave.

The response signal may be analyzed by a signal analyzer or circuit(s) thereof and/or by an oscilloscope. These measurement devices are capable of measuring both the amplitude and the phase of the response signal, such that the measurement data comprises information on the amplitude and/or the phase of the response signal.

According to an aspect of the present disclosure, the electronic device comprises a filter, such as a filter circuit or module. The filter module is configured to filter an input signal provided to the electronic device based on at least one filter parameter, wherein the at least one operational parameter comprises the at least one filter parameter. Generally speaking, the filter module pre-compensates for the impairments described above by filtering the input signal. Thus, in order to calibrate the electronic device, the at least one filter parameter is adapted such that the response signal of the electronic device to the test signal has desired properties regarding the impairments.

According to another aspect of the present disclosure, the at least one filter parameter is adapted such that the impairments are at least one of attenuated, compensated and removed. In some embodiments, the at least one filter parameter is adapted such that the filter module pre-compensates for the impairments described above by filtering the input signal. This way, signal portions associated with the impairments are attenuated, compensated and/or removed, for example before the electronic device processes the input signal.

In a further embodiment of the present disclosure, the filter module comprises at least one time domain filter circuit or unit. In other words, the at least one filter parameter is established as a time-domain filter parameter, for example as a time-domain filter coefficient. For example, the at least one filter parameter may comprise at least one parameter that is associated with a step response and/or an impulse response of the filter module.

According to another aspect of the present disclosure, the filter module comprises at least one filter circuit or unit being associated with an in-phase channel of the electronic device and at least one filter circuit or unit being associated with a quadrature channel of the electronic device. Accordingly, the test signal may be established as an IQ-signal comprising an I-signal and a Q-signal. The filter unit associated with the in-phase channel of the electronic device connects an input side of the in-phase channel of the electronic device with an output side of the in-phase channel of the electronic device. Likewise, the filter unit associated with the quadrature channel of the electronic device connects an input side of the quadrature channel of the electronic device with an output side of the quadrature channel of the electronic device. Via the filter units that are each associated with only one of the in-phase channel and the quadrature channel, the in-phase channel and the quadrature channel can be calibrated individually.

The filter module may be configured to filter an IQ signal, more precisely an I-signal and a Q-signal, such that the impairments described above are attenuated, compensated and/or removed from the I-signal and/or from the Q-signal.

In a further embodiment of the present disclosure, the filter module comprises at least one filter circuit or unit being associated with both an in-phase channel of the electronic device and a quadrature channel of the electronic device. The at least one filter unit associated with both the in-phase channel and the quadrature channel connects an input side of the in-phase channel of the electronic device with an output side of the quadrature channel of the electronic device. Alternatively or additionally, the at least one filter unit associated with both the in-phase channel and the quadrature channel connects an input side of the quadrature channel of the electronic device with an output side of the in-phase channel of the electronic device.

Via the at least one filter unit that is associated with both of the in-phase channel and the quadrature channel, an interdependency between the in-phase channel and the quadrature channel can be taken into account for the calibration of the electronic device.

In some embodiments, the test signal comprises an asymmetric frequency comb (e.g., frequency comb circuit). Usually, frequency combs have a symmetric frequency spectrum, more precisely an axially symmetric frequency spectrum. However, it has turned out that asymmetric frequency combs are particularly suitable for calibrating the electronic device over a larger bandwidth. It has further turned out that the ideal response of the electronic device to the asymmetric frequency comb and the contributions from the impairments do not overlap in frequency space, or at least can be separated from one another unambiguously even for larger predefined bandwidths of the test signal. In other words, the ideal response of the electronic device and the impairments are mutually orthogonal.

According to an aspect of the present disclosure, the test signal is established as a multi-carrier signal. The asymmetric signal component of the test signal may comprise several carrier signals, for example wherein the individual carrier signals do not overlap with each other in frequency domain. In other words, the several carrier signals may be mutually orthogonal.

According to another aspect of the present disclosure, a set of mathematical equations is determined based on the measurement data, wherein the at least one operational parameter is a parameter of the set of mathematical equations. Generally speaking, the set of mathematical equations links an output signal of the filter module with an input signal of the filter module. Moreover, the set of mathematical equations describes the ideal response signal as well as the impairments of the response signal.

More precisely, the set of mathematical equations describe the connectedness between an input signal provided to the electronic device (e.g. the test signal), a filtered input signal, i.e. the input signal that is filtered via the filter module, and a response signal of the electronic device.

As the test signal comprises the asymmetric signal component, the resulting set of mathematical equations is linearly independent. Therein, both the response signal portions having negative frequency and the response signal portions having positive frequency carry information on the impairments, wherein this information on the impairments is comprised in the set of mathematical equations.

According to another aspect of the present disclosure, the at least one operational parameter is determined based on the set of mathematical equations. For example, the at least one operational parameter is determined by fitting the set of mathematical equations to the measurement data.

In some embodiments, the at least one operational parameter is determined via a least squares technique.

The predefined bandwidth of the test signal may be bigger than or equal to 10% of a bandwidth of the electronic device. In some embodiments, the predefined bandwidth of the test signal is bigger than or equal to 25% of the bandwidth of the electronic device. For example, the predefined bandwidth of the test signal is bigger than or equal to 50% of the bandwidth of the electronic device.

Accordingly, several (i.e. at least two) different calibration iterations may be performed with different test signals having different frequency ranges, and the results of the individual iterations may be combined in order to completely calibrate the electronic device.

This may, e.g., be necessary if the electronic device is established as a signal generator, and if a maximum bandwidth of the associated analysis module (e.g. an oscilloscope or a signal analyzer) is smaller than the maximum bandwidth of the electronic device. Thus, in this case, the test signal generated by the electronic device does not have the maximum possible bandwidth, but rather a bandwidth that is adapted to the maximum bandwidth of the signal analysis module.

However, the number of necessary calibration iterations is still significantly smaller compared to the case where CW signals having a single frequency are used for the calibration.

According to a further embodiment of the present disclosure, the predefined bandwidth of the test signal is equal to or bigger than a bandwidth of the electronic device. Thus, the electronic device may be calibrated in a single calibration iteration, i.e. in a particularly fast and convenient manner.

Embodiments of the present disclosure further provide a calibration system. The calibration system comprises a test circuit or module, an electronic circuit or device and an analysis circuit or module. The test module is configured to generate a test signal having a predefined bandwidth. Alternatively or additionally, the test module is configured to generate an instruction signal comprising instructions for the electronic device to generate a test signal having a predefined bandwidth. The test signal comprises an asymmetric signal component being asymmetric in frequency domain. The test signal further comprises a symmetric signal component being symmetric in frequency domain. The electronic device is configured to process the test signal, thereby generating a response signal of the electronic device to the test signal. The analysis module is configured to analyze the response signal, thereby generating measurement data comprising information on impairments due to at least one of a frequency selective channel of the electronic device and an IQ mismatch of the electronic device. The calibration system is configured to adapt at least one operational parameter of the electronic device based on the measurement data in order to calibrate the electronic device.

In some embodiments, the calibration system is configured to perform the calibration method described above.

Regarding the advantages and further characteristics of the calibration system, reference is made to the explanations given above with respect to the calibration method, which also hold for the calibration system and vice versa.

The electronic device may be established as a signal generator or circuit thereof.

Alternatively, the electronic device may be established as a test and/or measurement instrument, a receiver and/or as any other kind of electronic device being configured to process an electric signal, for example an IQ signal.

In some embodiments, the electronic device comprises a filter, such as a filter circuit or module, the filter module being configured to filter an input signal provided to the electronic device based on at least one filter parameter, and wherein the at least one operational parameter comprises the at least one filter parameter. Generally speaking, the filter module is configured to pre-compensate for the impairments described above by filtering the input signal. Thus, in order to calibrate the electronic device, the at least one filter parameter is adapted such that the response signal of the electronic device to the test signal has desired properties regarding the impairments.

The filter module may comprise at least one filter circuit or unit being associated with an in-phase channel of the electronic device and at least one filter circuit or unit being associated with a quadrature channel of the electronic device. Accordingly, the test signal may be established as an IQ-signal comprising an I-signal and a Q-signal. The filter unit associated with the in-phase channel of the electronic device connects an input side of the in-phase channel of the electronic device with an output side of the in-phase channel of the electronic device. Likewise, the filter unit associated with the quadrature channel of the electronic device connects an input side of the quadrature channel of the electronic device with an output side of the quadrature channel of the electronic device. Via the filter units that are each associated with only one of the in-phase channel and the quadrature channel, the in-phase channel and the quadrature channel can be calibrated individually.

The filter module may be configured to filter an IQ signal, more precisely an I-signal and a Q-signal, such that the impairments described above are attenuated, compensated and/or removed from the I-signal and/or from the Q-signal.

According to an aspect of the present disclosure, the filter module comprises at least one filter circuit or unit being associated with both an in-phase channel of the electronic device and a quadrature channel of the electronic device. The at least one filter unit associated with both the in-phase channel and the quadrature channel connects an input side of the in-phase channel of the electronic device with an output side of the quadrature channel of the electronic device. Alternatively or additionally, the at least one filter unit associated with both the in-phase channel and the quadrature channel connects an input side of the quadrature channel of the electronic device with an output side of the in-phase channel of the electronic device.

Via the at least one filter unit that is associated with both of the in-phase channel and the quadrature channel, and interdependency between the in-phase channel and the quadrature channel can be taken into account for the calibration of the electronic device.

The analysis circuit or module may be configured to determine a set of mathematical equations based on the measurement data, wherein the at least one operational parameter is a parameter of the set of mathematical equations. Generally speaking, the set of mathematical equations links an output signal of the filter module with an input signal of the filter module. Moreover, the set of mathematical equations describes the ideal response signal as well as the impairments of the response signal.

More precisely, the set of mathematical equations describe the connectedness between an input signal provided to the electronic device (e.g. the test signal), a filtered input signal, i.e. the input signal that is filtered via the filter module, and a response signal of the electronic device.

As the test signal comprises the asymmetric signal component, the resulting set of mathematical equations is linearly independent. Therein, both the response signal portions having negative frequency and the response signal portions having positive frequency carry information on the impairments, wherein this information on the impairments is comprised in the set of mathematical equations.

In a further embodiment of the present disclosure, the analysis module is configured to determine the at least one operational parameter based on the set of mathematical equations. For example, the analysis module may be configured to determine the at least one operational parameter by fitting the set of mathematical equations to the measurement data.

In some embodiments, the analysis module may be configured to determine the at least one operational parameter via a least squares technique.

In some embodiments, the predefined bandwidth of the test signal is bigger than or equal to 10% of a bandwidth of the electronic device. In some embodiments, the predefined bandwidth of the test signal is bigger than or equal to 25% of the bandwidth of the electronic device. For example, the predefined bandwidth of the test signal is bigger than or equal to 50% of the bandwidth of the electronic device.

Accordingly, several (i.e. at least two) different calibration iterations may be performed with by the calibration system with different test signals having different frequency ranges, and the results of the individual iterations may be combined in order to completely calibrate the electronic device.

This may, e.g., be necessary if the electronic device is established as a signal generator, and if a maximum bandwidth of the associated analysis module (e.g. oscilloscope or signal analyzer) is smaller than the maximum bandwidth of the electronic device. Thus, in this case, the test signal generated by the electronic device does not have the maximum possible bandwidth, but rather a bandwidth that is adapted to the maximum bandwidth of the signal analysis module.

However, the number of necessary calibration iterations is still significantly smaller compared to the case where CW signals having a single frequency are used for the calibration.

According to a further embodiment of the present disclosure, the predefined bandwidth of the test signal is equal to or bigger than a bandwidth of the electronic device. Thus, the electronic device may be calibrated in a single calibration iteration, i.e. in a particularly fast and convenient manner.

Generally, the electronic device may have an internal I/Q modulator or one or more circuits thereof. For instance, the electronic device is a test and/or measurement device, a signal receiver or a signal generator.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIGS. 5A-5D respectively show one type of calibration signal.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
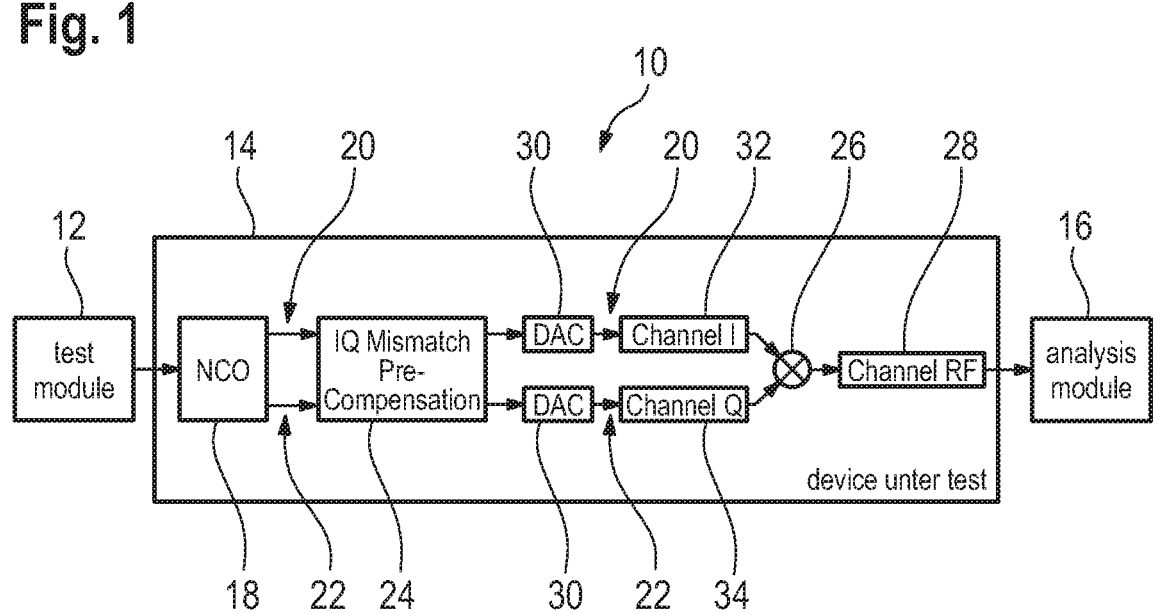
FIG. 1 schematically shows a block diagram of a calibration system according to an embodiment of the present disclosure.

FIG. 1 schematically shows a block diagram of a calibration system 10. The calibration system 10 comprises a test circuit or module 12, an electronic device 14 comprising one or more circuits, and an analysis circuit or module 16. The calibration system 10 is configured to calibrate the electronic device 14. The corresponding calibration method will be described in more detail below.

In general, the electronic device 14 is established as any electronic device being configured to receive an input signal and to generate an output signal based on the input signal. In the exemplary embodiment shown in FIG. 1, the electronic device 14 is established as a signal generator that is configured to generate an IQ signal. However, it is to be understood that the electronic device 14 may be established as any other type of electronic device, for example as a receiver, for example as an IQ receiver.

The analysis module 16 may be established as a measurement instrument, e.g. as a signal analyzer or as an oscilloscope. Alternatively, the analysis module 16 may be part of a measurement instrument, e.g. of a signal analyzer or as an oscilloscope.

The electronic device 14 comprises a signal generator circuit or unit 18, a first channel 20, and a second channel 22. In the exemplary embodiment shown in FIG. 1, the signal generator unit 18 is established as a numerically controlled oscillator (NCO) that is connected to both of the first channel 20 and the second channel 22. Alternatively, the signal generator unit 18 could comprise two separate NCOs, wherein each of the two NCOs is connected to one of the first channel 20 and the second channel 22.

It is noted that the signal generator unit 18 does not necessarily have to be established as an NCO. Instead, the signal generator 18 unit could be established as a memory that is configured to store waveform data that is associated with an output signal that is to be generated by the electronic device 14, particularly real and imaginary samples being associated with an output signal that is to be generated by the electronic device 14.

The electronic device 14 further comprises a filter circuit or module 24 downstream of the signal generator unit 18. The filter module 24 is associated with both of the channels 20, 22.

The electronic device 14 further comprises an additive mixer circuit or unit 26 and an RF path 28 introducing an additional RF channel.

In the exemplary embodiment of FIG. 1, the first channel 20 is established as an in-phase channel, while the second channel 22 is established as a quadrature channel. The first channel 20 and the second channel 22 respectively comprise a digital-to-analog converter 30 ("DAC" in the following). The first channel 20 further comprises a first analog signal processing circuit or unit 32 downstream of the DAC 30. The first analog signal processing unit 32 may comprise a filter circuit or unit and/or a mixer circuit or unit that is configured to mix a signal propagating in the first channel 20 with a sine-shaped signal. Likewise, the second channel 22 comprises a second analog signal processing circuit or unit 34 downstream of the DAC 30. The second analog signal processing unit 34 may comprise a filter circuit or unit and/or a mixer circuit or unit that is configured to mix a signal propagating in the second channel 22 with a cosine-shaped signal.

Figure 2:
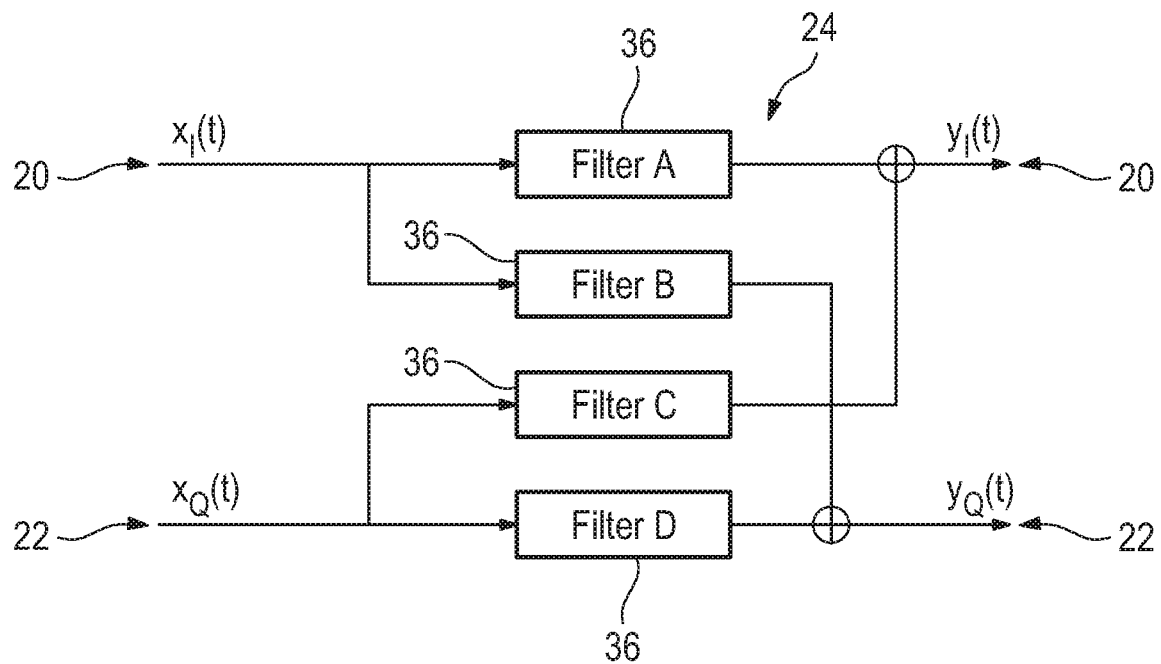
FIG. 2 schematically shows a block diagram of a filter module of the calibration system of FIG. 1.

FIG. 2 shows the filter module 24 in more detail. The filter module 24 is established as a digital time-domain filter. The filter module 24 comprises four filter units 36 that are denoted by "filter A", "filter B", "filter C", and "filter D" in FIG. 2.

Filter A connects an input side of the filter module 24 that is associated with the first channel 20 with an output side of the filter module 24 that is associated with the first channel 20. An impulse response of Filter A will be denoted by a(t) in the following.

Filter B connects an input side of the filter module 24 that is associated with the first channel 20 with an output side of the filter module 24 that is associated with the second channel 22. An impulse response of Filter B will be denoted by b(t) in the following.

Filter C connects an input side of the filter module 24 that is associated with the second channel 22 with an output side of the filter module 24 that is associated with the first channel 20. An impulse response of Filter C will be denoted by c(t) in the following.

Filter D connects an input side of the filter module 24 that is associated with the second channel 22 with an output side of the filter module 24 that is associated with the second channel 22. An impulse response of Filter D will be denoted by d(t) in the following.

In general, output signals generated by the electronic device 14 bear certain types of impairments due to imperfect hardware of the electronic device 14.

For example, the output signal may be impaired due to frequency selective channels of the electronic device 14.

Moreover, respective transfer functions and/or impulse responses of the individual channels 20, 22, for example transfer functions and/or impulse responses of the first analog signal processing unit 32 and the second analog signal processing unit 34 may be different from each other, which results in a (frequency selective) relative phase shift and/or (frequency selective) relative attenuation of the individual signals associated with the individual channels 20, 22. This phenomenon is also known as IQ-impairment.

Figure 3:
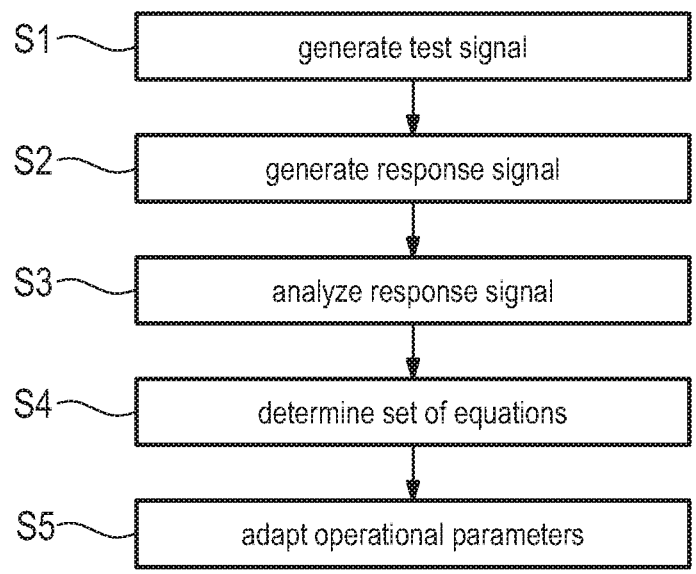
FIG. 3 shows a flow chart of a calibration method according to an embodiment of the present disclosure.

The calibration system 10 is configured to perform a calibration method for calibrating the electronic device 14 in order to compensate for the impairments described above. Examples of the calibration method is described in the following with reference to FIG. 3.

A test signal having a predefined bandwidth is generated (step S1). In the particular embodiment of the calibration system 10 shown in FIG. 1, the test signal is generated by the electronic device 14 itself. More precisely, the signal generator unit 18 generates an in-phase signal $x_I(t)$ that is associated with the first channel 20, and a quadrature signal $x_Q(t)$ that is associated with the second channel 22.

Thus, the test module 12 generates an instruction signal comprising instructions for the electronic device 14 to generate the test signal with the predetermined bandwidth.

However, for other types of devices under test, for example for IQ receivers, the test signal may be generated by the test module 12 and may then be forwarded to the electronic device 14.

Figure 4:
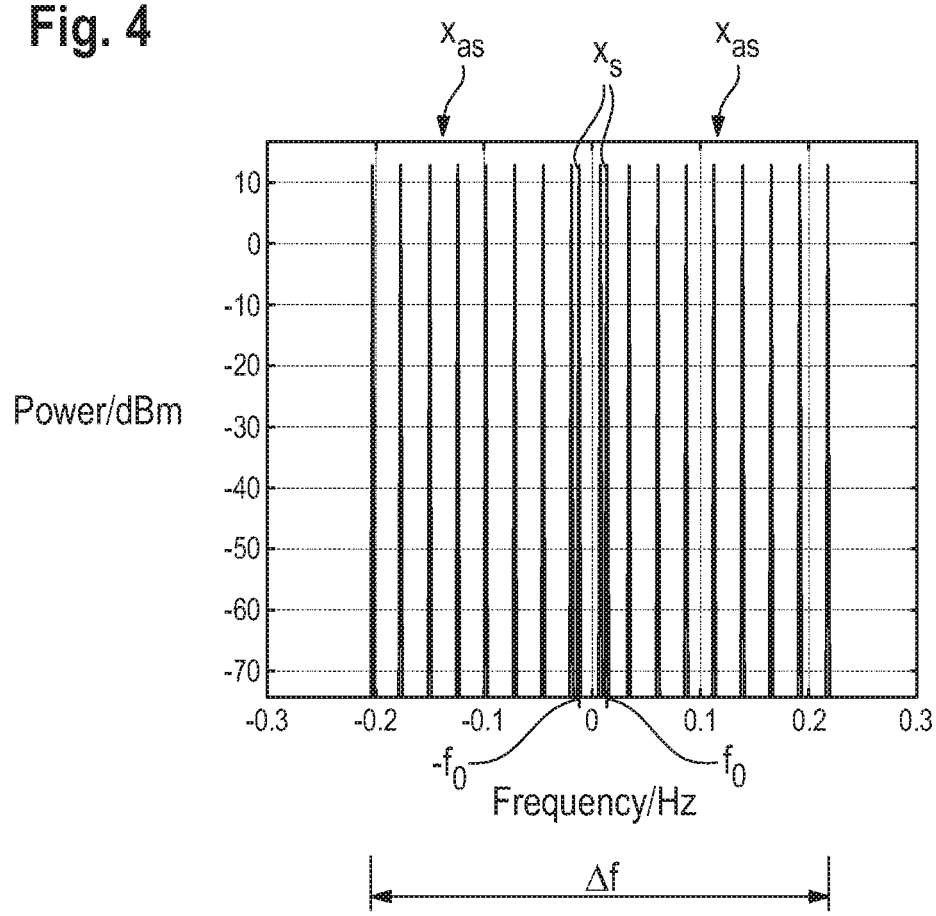
FIG. 4 shows a diagram of a representative test signal.

The test signal that is generated by the electronic device 14 is illustrated in FIG. 4, which shows a diagram of an squared absolute value $(x_I+ix_Q)·(x_I+ix_Q)^*$ of the test signal plotted against frequency, wherein "*" denotes complex conjugation.

In general, the test signal is established as a multi-carrier signal comprising several carrier-frequencies over a predefined bandwidth $\Delta f$.

In some embodiments, the test signal comprises an asymmetric signal $x_{as}$ that is asymmetric in frequency domain, and a symmetric signal component $x_s$ that is symmetric in frequency domain.

Therein and in the following, the term "asymmetric in frequency domain" is understood to denote a signal having a non-symmetric frequency spectrum. In some embodiments, an absolute value of the frequency spectrum is non-symmetric.

Likewise, the term "symmetric in frequency domain" is understood to denote a signal having a symmetric frequency spectrum, wherein the symmetry may be one of an axial symmetry and a point symmetry. In some embodiments, an absolute value of the frequency spectrum is axially symmetric, such that the frequency spectrum itself may be one of axially symmetric and anti-symmetric.

More precisely, the test signal comprises an asymmetric frequency comb and two additional comb teeth at frequencies $f_0$ and $-f_0$, wherein the two additional comb teeth form the symmetric signal component $x_s$.

The asymmetric signal component $x_s$ has the same bandwidth as the test signal itself, i.e. the predetermined bandwidth $\Delta f$.

The predefined bandwidth $\Delta f$ of the test signal may be bigger than 10% of a bandwidth of the electronic device 14.

In some embodiments, the predefined bandwidth $\Delta f$ of the test signal is bigger than 25% of the bandwidth of the electronic device 14. For example, the predefined bandwidth $\Delta f$ of the test signal is bigger than 50% of the bandwidth of the electronic device 14.

The predefined bandwidth $\Delta f$ may even be equal to or bigger than the bandwidth of the electronic device 14.

The test signal is then processed by the electronic device 14, thereby generating a response signal (step S2). In the context of the embodiment of FIG. 1, the term "processed" is understood to mean processing by all components downstream of the signal generator unit 18.

For the purpose of calibration, the filter module 24 may be set to unity, i.e. the impulse responses of the filter units 36 may be chosen as a(t)=1, b(t)=0, c(t)=0, and d(t)=1. Thus, the test signal is not altered by the filter module 24.

The test signal is then converted into a corresponding analog signal by the DACs 30 and converted into an IQ signal by the first signal processing unit 32, the second signal processing unit 34, and the mixer unit 26.

More precisely, the in-phase signal $x_I$ is digitized and then mixed with a sine-shaped signal by the first analog signal processing unit 32. Additionally, the in-phase signal $x_I$ may be filtered by a filter unit of the first analog signal processing unit 32.

Moreover, the quadrature signal $x_Q$ is digitized and then mixed with a cosine-shaped signal by the second analog signal processing unit 34. Additionally, the quadrature signal $x_Q$ may be filtered by a filter unit of the second analog signal processing unit 34.

The signals output by the first channel 20 and the second channel 22 are then superimposed by the mixer unit 26. The superposed signal may then be further processed by the RF path 28, e.g. by a filter unit of the RF path 28.

The output signal of the RF path 28 is the response signal of the electronic device 14.

The response signal is then analyzed by the analysis module 16, thereby generating measurement data (S3).

Generally speaking, the measurement data comprises information on impairments due to at least one of a frequency selective channel of the electronic device 14 and an IQ mismatch of the electronic device 14.

The measurement data is illustrated in FIGS. 5A-5D. FIG. 5A shows a plot of measurement data corresponding to an ideal calibration signal, i.e. corresponding to an ideal response of the electronic device 14 when there are no impairments present at all.

FIG. 5B shows a plot of measurement data corresponding to a real calibration signal, i.e. corresponding to a real response of the electronic device 14 to the test signal.

FIG. 5C shows the real calibration signal of FIG. 5B with the additional impairments described above being present.

FIG. 5D shows a compensated calibration signal, i.e. a response signal of the electronic device 14 in which the impairments described above have been removed.

A set of mathematical equations is determined based on the measurement data gathered (step S4).

In general, the set of mathematical equations links an input signal $x(t)=x_I(t)+ix_Q(t)$ on the input side of the filter module 24 with a filtered input signal $y(t)=y_I(t)+iy_Q(t)$ at an output side of the filter module 24.

Moreover, the set of mathematical equations describes the ideal response signal as well as the impairments of the response signal. More precisely, the set of mathematical equations describe the connectedness between the input signal provided to the electronic device 14 and the response signal of the electronic device 14.

As the test signal comprises the asymmetric signal component $x_{as}$, the resulting set of mathematical equations is linearly independent. This is because due to the asymmetric signal component, the ideal response of the electronic device 14 and the contributions from the impairments do not overlap in frequency space, or at least can be separated from one another unambiguously.

Moreover, due to the symmetric signal component in the test signal, the phase ambiguity between the I-signal and the Q-signal is resolved, as the phase of the test signal can be unambiguously determined from the symmetric signal component.

The set of mathematical equations is derived as follows:

An input signal provided by the signal generator unit 18 on the input side of the filter module 24 is given by $x(t)=x_I(t)+ix_Q(t)$.

A filtered input signal on the output side of the filter module 24 is then given by $y(t)=y_I(t)+iy_Q(t)$.

In the following, the time dependence of the test signal and of the impulse responses a, b, c, d of the filter units 36 will not be explicitly written out for the sake of better legibility.

The filtered input signal y can be calculated according to the formula $$y = \frac{1}{2} x \otimes (a + ib + d - ic) + \frac{1}{2} x^* \otimes (a + ib - (d - ic)),$$

wherein "$\otimes$" denotes the convolution operator in time space.

With the abbreviations $u=a+ib$ and $u=d-ic$, and a transformation of the equation to frequency domain, this becomes $$Y_k = \frac{1}{2} X_k (U_k + V_k) + \frac{1}{2} X^*_{-k} (U_k - V_k).$$

Therein, k is a frequency index, while capital letters denote the frequency domain function corresponding to the respective function associated with the small letter.

The filter module 24 has to compensate a signal s which is linearly distorted by a channel c and overlapped by a certain amount m of its own mirror spectrum, i.e.

$$X_k = S_k \cdot C_k + S^*_{-k} \cdot M_k.$$

$C_k$ and $M_k$ can be determined from the measurement data described above, because the test signal comprises the asymmetric signal component $x_{as}$. For the correct timing in determining $C_k$ and $M_k$, the symmetric signal component $x_s$ is needed, since otherwise there is an ambiguity between timing and phase offset. This yields the equation $$Y_k = S_k \cdot \frac{1}{2} \cdot (C_k \cdot (U_k + V_k) + M^*_{-k} \cdot (U_k - V_k)) +$$
$$S^*_{-k} \cdot \frac{1}{2} \cdot (M_k \cdot (U_k + V_k) + C^*_{-k} \cdot (U_k - V_k))$$

The filter output y shall be as close as possible to the original signals, i.e. $U_k$ and $V_k$ have to be chosen such that $\|Y-S\|$ is minimized. Based on a so-called "zero-forcing approach", minimizing $\|Y-S\|$ yields the equations $$C_k \cdot (U_k + V_k) + M^*_{-k} \cdot (U_k - V_k) = 2$$

$$M_k \cdot (U_k + V_k) + C^*_{-k} \cdot (U_k - V_k) = 0$$

These equations are solved by $$U_k = \frac{C^*_{-k} - M_k}{C_k \cdot C^*_{-k} - M_k \cdot M^*_{-k}} \text{ and}$$

$$V_k = \frac{C^*_{-k} + M_k}{C_k \cdot C^*_{-k} - M_k \cdot M^*_{-k}}$$

Of course, other suitable methods than the zero-forcing approach may be used in order to minimize $\|Y-S\|$.

The time domain impulse responses $u=a+ib$ and $v=d-ic$ are then determined by a least squares approach to fit the required frequency components $U_k$ and $V_k$, respectively.

In other words, a set of operational parameters for the electronic device 14 is determined based on the set of mathematical equations as described above, wherein the operational parameters are filter parameters, i.e. impulse responses of the individual filter units 36 of the filter module 24.

Finally, the operational parameters of the electronic device 14 are adapted based on the analysis of the measurement data described above (step S5). More precisely, the impulse responses of the filter units 36 of the filter module 24 are set to the ones determined in step S4, as described above.

With the filter parameters set that way, the filter module 24 pre-compensates for the impairments described above by filtering an input signal generated by the signal generator unit 18 (or provided to the electronic device 14).

This way, signal portions associated with the impairments are attenuated, compensated and/or removed from any input signal generated and/or processed by the electronic device 14.

Depending on the predefined bandwidth of the test signal, several (i.e. at least two) different calibration iterations of steps S1 to S5 may be performed with different test signals having different frequency ranges, and the results of the individual iterations may be combined in order to completely calibrate the electronic device 14.

This may, e.g., be necessary if the electronic device 14 is established as a signal generator, and if a maximum bandwidth of the associated analysis module 16 (e.g. an oscilloscope or a signal analyzer) is smaller than the maximum bandwidth of the electronic device 14. Thus, in this case, the test signal generated by the electronic device 14 does not have the maximum possible bandwidth, but rather a bandwidth that is adapted to the maximum bandwidth of the signal analysis module 16.

If, however, the predefined bandwidth is equal to or bigger than the bandwidth of the electronic device 14, only a single calibration iteration is necessary.

Certain embodiments disclosed herein utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

In some examples, the methodologies and technologies described herein can be implemented by special purpose hardware-based computer systems or circuits, etc., or combinations of special purpose hardware and computer instructions.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A calibration method for calibrating an electronic device, said method comprising:
    generating a test signal having a predefined bandwidth, said test signal comprising an asymmetric signal component being asymmetric in frequency domain, and said test signal further comprising a symmetric signal component being symmetric in frequency domain;
    processing said test signal via said electronic device, thereby generating a response signal of said electronic device to said test signal;
    analyzing said response signal, thereby generating measurement data comprising information on impairments due to at least one of a frequency selective channel of said electronic device and an inphase and quadrature (IQ) mismatch of said electronic device; and
    adapting at least one operational parameter of said electronic device based on said measurement data in order to calibrate the electronic device.

2. The calibration method of claim 1, wherein said electronic device comprises a filter circuit, said filter circuit being configured to filter an input signal provided to the electronic device based on at least one filter parameter, and wherein said at least one operational parameter comprises said at least one filter parameter.

3. The calibration method of claim 2, wherein said at least one filter parameter is adapted such that said impairments are at least one of attenuated, compensated and removed.

4. The calibration method of claim 2, wherein said filter circuit comprises at least one time domain filter unit.

5. The calibration method of claim 2, wherein said filter circuit comprises at least one filter unit being associated with an in-phase channel of said electronic device and at least one filter unit being associated with a quadrature channel of said electronic device.

6. The calibration method of claim 2, wherein said filter circuit comprises at least one filter unit being associated with both an in-phase channel of said electronic device and a quadrature channel of said electronic device.

7. The calibration method of claim 1, wherein said test signal comprises an asymmetric frequency comb.

8. The calibration method of claim 1, wherein said test signal is established as a multi-carrier signal.

9. The calibration method of claim 1, wherein a set of mathematical equations is determined based on said measurement data, wherein said at least one operational parameter is a parameter of said set of mathematical equations.

10. The calibration method of claim 9, wherein said at least one operational parameter is determined based on said set of mathematical equations.

11. The calibration method of claim 1, wherein said predefined bandwidth of said test signal is bigger than or equal to 10% of a bandwidth of said electronic device.

12. The calibration method of claim 1, wherein said predefined bandwidth of the test signal is equal to or bigger than a bandwidth of said electronic device.

13. A calibration system, said calibration system comprising a test circuit, an electronic device and an analysis circuit, said test circuit being configured to generate a test signal having a predefined bandwidth or generate an instruction signal comprising instructions for the electronic device to generate a test signal having a predefined bandwidth, said test signal comprising an asymmetric signal component being asymmetric in frequency domain, and said test signal further comprising a symmetric signal component being symmetric in frequency domain;
- said electronic device being configured to process said test signal, thereby generating a response signal of said electronic device to said test signal;
- said analysis circuit being configured to analyze said response signal, thereby generating measurement data comprising information on impairments due to at least one of a frequency selective channel of said electronic device and an inphase and quadrature (IQ) mismatch of said electronic device; and
- said calibration system being configured to adapt at least one operational parameter of said electronic device based on said measurement data in order to calibrate the electronic device.

14. The calibration system of claim 13, wherein said electronic device comprises a filter circuit, said filter circuit being configured to filter an input signal provided to the electronic device based on at least one filter parameter, and wherein said at least one operational parameter comprises said at least one filter parameter.

15. The calibration system of claim 13, wherein said filter circuit comprises at least one filter circuit being associated with an in-phase channel of said electronic device and at least one filter circuit being associated with a quadrature channel of said electronic device.

16. The calibration system of claim 13, wherein said filter circuit comprises at least one filter circuit being associated with both an in-phase channel of said electronic device and a quadrature channel of said electronic device.

17. The calibration system of claim 13, wherein said analysis circuit is configured to determine a set of mathematical equations based on said measurement data, wherein said at least one operational parameter is a parameter of said set of mathematical equations.

18. The calibration method of claim 17, wherein said analysis circuit is configured to determine said at least one operational parameter based on said set of mathematical equations.

19. The calibration system of claim 13, wherein said predefined bandwidth of said test signal is bigger than or equal to 10% of a bandwidth of said electronic device.

20. The calibration system of claim 13, wherein said predefined bandwidth of the test signal is equal to or bigger than a bandwidth of said electronic device.

* * * * *